(12) United States Patent
Cooper

(10) Patent No.: US 12,467,696 B2
(45) Date of Patent: Nov. 11, 2025

(54) COOKING APPARATUS WITH THERMAL ENERGY STORAGE SYSTEM

(71) Applicant: Timothy Patrick Cooper, Dun Laoghaire (IE)

(72) Inventor: Timothy Patrick Cooper, Dun Laoghaire (IE)

(*) Notice: Subject to any disclaimer, the term of this patent is extended or adjusted under 35 U.S.C. 154(b) by 0 days.

(21) Appl. No.: 18/844,426

(22) PCT Filed: Mar. 14, 2023

(86) PCT No.: PCT/EP2023/056425
§ 371 (c)(1),
(2) Date: Sep. 6, 2024

(87) PCT Pub. No.: WO2023/174911
PCT Pub. Date: Sep. 21, 2023

(65) Prior Publication Data
US 2025/0109912 A1    Apr. 3, 2025

(30) Foreign Application Priority Data

Mar. 14, 2022    (IE) .................................... 2022/0047
Jun. 21, 2022    (IE) .................................... 2022/0103

(51) Int. Cl.
*F28D 20/00*    (2006.01)
*F28D 21/00*    (2006.01)

(52) U.S. Cl.
CPC .. *F28D 20/0056* (2013.01); *F28D 2020/0069* (2013.01); *F28D 2020/0078* (2013.01);
(Continued)

(58) Field of Classification Search
CPC ......... F28D 20/0056; F28D 2020/0069; F28D 2020/0078; F28D 2020/0008;
(Continued)

(56) References Cited

U.S. PATENT DOCUMENTS 2,367,170 A * 1/1945 Fahrenwald .......... F24H 3/0405
219/385
2,670,425 A * 2/1954 Stone .................... F24H 3/0405
373/110
(Continued)

FOREIGN PATENT DOCUMENTS

CN    105605957 B    5/2018
CN    112377974 A    2/2021
(Continued)

OTHER PUBLICATIONS

DE-2229939-A1 Machine Translation (Year: 1974).*
(Continued)

*Primary Examiner* — Travis Ruby
(74) *Attorney, Agent, or Firm* — Michael Crilly, Esquire

(57) ABSTRACT

A thermal energy storage system comprises a heat storage unit having a thermally insulated housing containing a heating core of thermal storage material, such as a plurality of thermal storage bricks. An electric heating element is provided for heating the thermal storage bricks forming the core to a desired temperature. Heat extraction apparatus is provided for extracting thermal energy from the core. The heat extraction apparatus comprises a first air heat exchanger connected to the core to heat air in the first air heat exchanger. An air circulation pipe is connected between the first air heat exchanger and a compartment to be heated, such as an oven. An air circulation fan is mounted in the air circulation pipe between the air heat exchanger and the compartment. A fan controller is operable for controlling operation of the fan to regulate temperature in the compartment.

7 Claims, 14 Drawing Sheets

(52) U.S. Cl.
CPC .............. *F28D 2021/0024* (2013.01); *F28D 2021/0035* (2013.01); *F28D 2021/0056* (2013.01)

(58) Field of Classification Search
CPC ..... F28D 2021/0024; F28D 2021/0035; F28D 2021/0056
See application file for complete search history.

(56) References Cited

U.S. PATENT DOCUMENTS

| | | | | |
|---|---|---|---|---|
| 2,808,494 | A * | 10/1957 | Telkes | F24H 7/04 23/300 |
| 2,911,513 | A * | 11/1959 | Maccracken | F24H 7/0233 165/47 |
| 3,381,113 | A * | 4/1968 | Jacques | F24H 7/0433 501/141 |
| 3,624,356 | A * | 11/1971 | Havill | F24H 7/002 126/400 |
| 3,989,927 | A * | 11/1976 | Erb | C09K 5/14 126/400 |
| 4,085,333 | A * | 4/1978 | Grise | F28D 20/0056 60/659 |
| 4,350,200 | A * | 9/1982 | McElwain | F24D 11/0221 126/633 |
| 4,452,229 | A * | 6/1984 | Powers | F28D 20/0056 126/400 |
| 4,520,862 | A * | 6/1985 | Helmbold | F28D 20/0056 165/10 |
| 4,814,582 | A * | 3/1989 | Schreder | F24C 15/2042 219/468.2 |
| 5,201,024 | A | 4/1993 | Steffes | |
| 5,694,515 | A * | 12/1997 | Goswami | F28D 20/0056 137/341 |
| 5,696,872 | A * | 12/1997 | Seward | F28D 20/0056 219/400 |
| 6,050,176 | A * | 4/2000 | Schultheis | H05B 3/74 99/422 |
| 6,772,823 | B2 * | 8/2004 | Hirano | F28D 20/0056 165/902 |
| 8,991,183 | B2 * | 3/2015 | Stiesdal | F02C 6/14 60/659 |
| 11,530,626 | B2 * | 12/2022 | O'Donnell | F01K 3/08 |
| 2012/0037148 | A1 * | 2/2012 | Tudor | F28D 20/02 126/400 |
| 2018/0231316 | A1 * | 8/2018 | Watremetz | C09K 5/14 |
| 2018/0372420 | A1 * | 12/2018 | Ahadi | F28F 9/02 |
| 2020/0018557 | A1 * | 1/2020 | Johnson | F28D 20/02 |
| 2021/0389056 | A1 * | 12/2021 | Calvet | F28D 17/02 |
| 2023/0194124 | A1 | 6/2023 | Doerbeck et al. | |

FOREIGN PATENT DOCUMENTS

| | | | |
|---|---|---|---|
| CN | 212853221 U | 4/2021 | |
| CN | 110220405 B | 7/2021 | |
| CN | 113237369 A | 8/2021 | |
| CN | 114152130 A | 3/2022 | |
| DE | 2229939 A1 * | 1/1974 | ............. F24C 15/34 |
| DE | 102007019167 A1 | 10/2008 | |
| DE | 102020111987 A1 | 11/2021 | |
| GB | 1287690 A | 9/1972 | |
| GB | 2577579 A | 4/2020 | |
| JP | H07103576 A | 4/1954 | |
| JP | S63311046 A | 12/1988 | |
| JP | 2016153708 A | 8/2016 | |
| JP | 2018159002 A | 10/2018 | |

OTHER PUBLICATIONS

International Search Report for PCT/EP2023/056425, European Patent Office, Completed Aug. 2, 2023 (5 pages).
Written Opinion of the International Searching Authority, European Patent Office, Completed Aug. 2, 2023 (8 pages).
Search Report Under Section 29, Intellectual Property Office of Ireland, Completed Aug. 18, 2022 (2 pages).
Written Opinion on Patentability, Intellectual Property Office of Ireland, Completed Aug. 18, 2022 (3 pages).

* cited by examiner

COOKING APPARATUS WITH THERMAL ENERGY STORAGE SYSTEM

REFERENCE TO RELATED APPLICATIONS

This application is a national phase to PCT Application No. PCT/EP2023/056425 filed Mar. 14, 2023 which in turn claims priority to Irish Patent Application No. S2022/0103 filed Jun. 21, 2022 and Irish Patent Application No. 2022/0047 filed Mar. 14, 2022, wherein each said application is entitled Thermal Energy Storage System and all said applications are incorporated in their entirety herein by reference thereto.

FEDERALLY SPONSORED RESEARCH AND DEVELOPMENT

None.

FIELD OF THE INVENTION

This invention relates to a thermal energy storage system, in particular for cooking, boiling water, making tea and coffee, heating water and for space heating.

BACKGROUND OF THE INVENTION

The invention is a thermal energy storage system which addresses a need in the field.

SUMMARY OF THE INVENTION

According to the invention, there is provided a thermal energy storage system comprising a heat storage unit having a thermally insulated housing containing a heating core of thermal storage material and an electric heating element for heating the heating core to a desired temperature, heat extraction apparatus for extracting thermal energy from the core, the heat extraction apparatus comprising an air heat exchanger connected to the core to heat air in the air heat exchanger, an air circulation pipe connected between the air heat exchanger and a compartment to be heated, an air circulation fan mounted in the air circulation pipe for circulating air through the air circulation pipe between the air heat exchanger and the compartment, characterized in that the heat exchanger has a housing with an air passageway extending through the housing between an air inlet and an air outlet of the housing, a heat transfer plate embedded within the core and connected to the housing to heat the housing.

In one embodiment of the invention, the heat exchanger housing is mounted on an outer face of the core and the heat transfer plate extends outwardly from the housing into the core.

In another embodiment, the heat transfer plate is T-shaped, having an inner part embedded within the core and an outer part engaging against an outer face of the core, the heat exchanger housing mounted against an outer face of the outer part of the heat transfer plate.

In another embodiment, the heat exchanger is embedded within the core.

In another embodiment, the heat exchanger housing is formed between two spaced-apart heat transfer plates mounted within the core.

In another embodiment, the housing is centrally mounted between the two heat transfer plates leaving a slot at each side of the housing between the heat transfer plates, each slot being filled with the thermal storage material forming the core.

In another embodiment, the housing has a downwardly stepped air inlet duct at the air inlet and a downwardly stepped air outlet duct at the air outlet of the housing.

In another embodiment, wherein the heat exchanger is a plate heat exchanger.

In another embodiment, the air circulation pipe has a feed line for delivering air from the heat exchanger to the compartment and a return line for delivering air from the compartment to the heat exchanger, a bypass valve mounted between the feed line and the return line for bypassing the heat exchanger, the bypass valve having a controller which is operable for blending a quantity of air from the return line with air in the feed line to regulate the temperature of air delivered by the feed line to the compartment.

In another embodiment, a fan controller is provided for controlling operation of the fan to regulate the temperature in the compartment.

In another embodiment, the fan controller comprises an on/off switch and/or a fan speed regulator.

In another embodiment, a plurality of compartments are connected to the core for extracting thermal energy from the core.

In another embodiment, at least one hot plate is mounted on the housing in thermal communication with the core.

In another embodiment, the hot plate is movable relative to the core for regulating the temperature of the hot plate in use.

In another embodiment, the hot plate has a plurality of spaced-apart support rods at an underside of the hot plate to support the hot plate on top of the core, such that thermal expansion and contraction of the support rods moves the hot plate relative to the core for temperature regulation.

In another embodiment, the support rods are mounted within complementary support rod receiving sockets at an underside of the hot plate.

In another embodiment, each support rod has a pointed lower end in contact with a heat transfer plate at a top of the core.

In another embodiment, the hot plate has an outer part and an inner part which overlap and are interconnected by a plurality of spaced-apart connector rods which extend therebetween.

In another embodiment, opposite ends of the connector rods are mounted within complementary connector rod receiving sockets at an underside of the outer part and at a top of the inner part.

In another embodiment, an insert of heat-reflective material is mounted between the outer part and the inner part.

In another embodiment, a top surface of the inner part is coated with a low emissivity material.

In another embodiment, an underside of the outer part is coated with a low emissivity material.

In another embodiment, the outer part and the inner part are formed by a pair of graphite elements stacked together and interconnected by the connector rods.

In another embodiment, the graphite elements are interconnected by metal connector rods and metal support rods at an underside of the graphite inner part engage and support the hot plate on a metal heat transfer plate at a top of the core.

In another embodiment, each hot plate is supported on a metal rod which extends into an associated hole in the hot plate, the rod extending when heated to lift the hot plate away from the core.

In another embodiment, a water boiler is mounted on the heat storage unit, the water boiler comprising a water heating tank mounted on or within the heating core, the water heating tank having a water inlet for connection to a water supply and an outlet for discharging hot water and steam from the water heating tank.

In another embodiment, the outlet of the water heating tank is connected to a hot water storage tank.

In another embodiment, the outlet of the water heating tank is connected to the hot water storage tank by a hot water discharge pipe having an inlet adjacent a bottom of the water heating tank and an outlet adjacent a top of the hot water storage tank.

In another embodiment, the hot water storage tank has a dispensing tap for discharging hot water from the hot water storage tank.

In another embodiment, the heating core comprises one or more thermal storage elements.

In another embodiment, the heating core comprises a plurality of thermal storage bricks.

In another embodiment, the compartment is a room forming a working space, a living space or a storage space.

In another embodiment, the compartment is an oven.

In another aspect, the invention provides a cooker comprising a heat storage unit having a thermally insulated housing containing a heating core of thermal storage material and an electric heating element for heating the heating core to a desired temperature, and at least one hot plate mounted on the housing in thermal communication with the core.

In another embodiment, the hot plate is movable relative to the core for regulating the temperature of the hot plate in use.

In another embodiment, the hot plate has a plurality of spaced-apart support rods at an underside of the hot plate to support the hot plate on top of the core, such that thermal expansion and contraction of the support rods moves the hot plate relative to the core for temperature regulation.

In another embodiment, the support rods are mounted within complementary support rod receiving sockets at an underside of the hot plate.

In another embodiment, each support rod has a pointed lower end in contact with a heat transfer plate at a top of the core.

In another embodiment, the hot plate has an outer part and an inner part which overlap and are interconnected by a plurality of spaced-apart connector rods which extend therebetween.

In another embodiment, opposite ends of the connector rods are mounted within complementary connector rod receiving sockets at an underside of the outer part and at a top of the inner part.

In another embodiment, an insert of heat-reflective material is mounted between the outer part and the inner part.

In another embodiment, a top surface of the inner part is coated with a low emissivity material.

In another embodiment, an underside of the outer part is coated with a low emissivity material.

In another embodiment, the outer part and the inner part are formed by a pair of graphite elements stacked together and interconnected by the connector rods.

In another embodiment, the graphite elements are interconnected by metal connector rods and metal support rods at an underside of the graphite inner part engage and support the hot plate on a metal heat transfer plate at a top of the core.

In another embodiment, each hot plate is supported on a metal rod which extends into an associated hole in the hot plate, the rod extending when heated to lift the hot plate away from the core.

In another embodiment, the cooker further includes heat extraction apparatus for extracting thermal energy from the core, the heat extraction apparatus comprising an air heat exchanger connected to the core to heat air in the air heat exchanger, an air circulation pipe connected between the air heat exchanger and an oven compartment to be heated, an air circulation fan mounted in the air circulation pipe for circulating air through the air circulation pipe between the air heat exchanger and the oven compartment, the heat exchanger having a housing with an air passageway extending through the housing between an air inlet and an air outlet of the housing, a heat transfer plate embedded within the core and connected to the housing to heat the housing.

In another embodiment, the heat exchanger housing is mounted on an outer face of the core and the heat transfer plate extends outwardly from the housing into the core.

In another embodiment, the heat transfer plate is T-shaped, having an inner part embedded within the core and an outer part engaging against an outer face of the core, the heat exchanger housing mounted against an outer face of the outer part of the heat transfer plate.

In another embodiment, the heat exchanger is embedded within the core.

In another embodiment, the heat exchanger housing is formed between two spaced-apart heat transfer plates mounted within the core.

In another embodiment, the housing is centrally mounted between the two heat transfer plates leaving a slot at each side of the housing between the heat transfer plates, each slot being filled with the thermal storage material forming the core.

In another embodiment, the housing has a downwardly stepped air inlet duct at the air inlet and a downwardly stepped air outlet duct at the air outlet of the housing.

In another embodiment, the heat exchanger is a plate heat exchanger.

In another embodiment, the air circulation pipe has a feed line for delivering air from the heat exchanger to the oven compartment and a return line for delivering air from the oven compartment to the heat exchanger, a bypass valve mounted between the feed line and the return line for bypassing the heat exchanger, the bypass valve having a controller which is operable for blending a quantity of air from the return line with air in the feed line to regulate the temperature of air delivered by the feed line to the oven compartment.

In another embodiment, a fan controller is provided for controlling operation of the fan to regulate the temperature in the compartment.

In another embodiment, the fan controller comprises an on/off switch.

In another embodiment, the fan controller comprises a fan speed regulator.

In another embodiment, a water boiler is mounted on the heat storage unit, the water boiler comprising a water heating tank mounted on or within the heating core, the water heating tank having a water inlet for connection to a water support and an outlet for discharging hot water and steam from the water heating tank.

In another embodiment, the outlet of the water heating tank is connected to a hot water storage tank.

In another embodiment, the outlet of the water heating tank is connected to the hot water storage tank by a hot water discharge pipe having an inlet adjacent a bottom of the water heating tank and an outlet adjacent a top of the hot water storage tank.

In another embodiment, the hot water storage tank has a dispensing tap for discharging hot water from the hot water storage tank.

In a further aspect, the invention provides a water boiler comprising a heat storage unit having a thermally insulated housing containing a heating core of thermal storage material and an electric heating element for heating the heating core to a desired temperature, a water heating tank mounted on or within the heating core, the water heating tank having a water inlet for connection to a water supply and an outlet for discharging hot water and steam from the water heating tank.

In another embodiment, the outlet of the water heating tank is connected to a hot water storage tank.

In another embodiment, the outlet of the water heating tank is connected to the hot water storage tank by a hot water discharge pipe having an inlet adjacent a bottom of the water heating tank and an outlet adjacent a top of the hot water storage tank.

In another embodiment, the hot water storage tank has a dispensing tap for discharging hot water from the hot water storage tank.

BRIEF DESCRIPTION OF THE DRAWINGS

The invention will be more clearly understood by the following description of some embodiments thereof, given by way of example only, with reference to the accompanying drawings.

DETAILED DESCRIPTION

Figure 1:
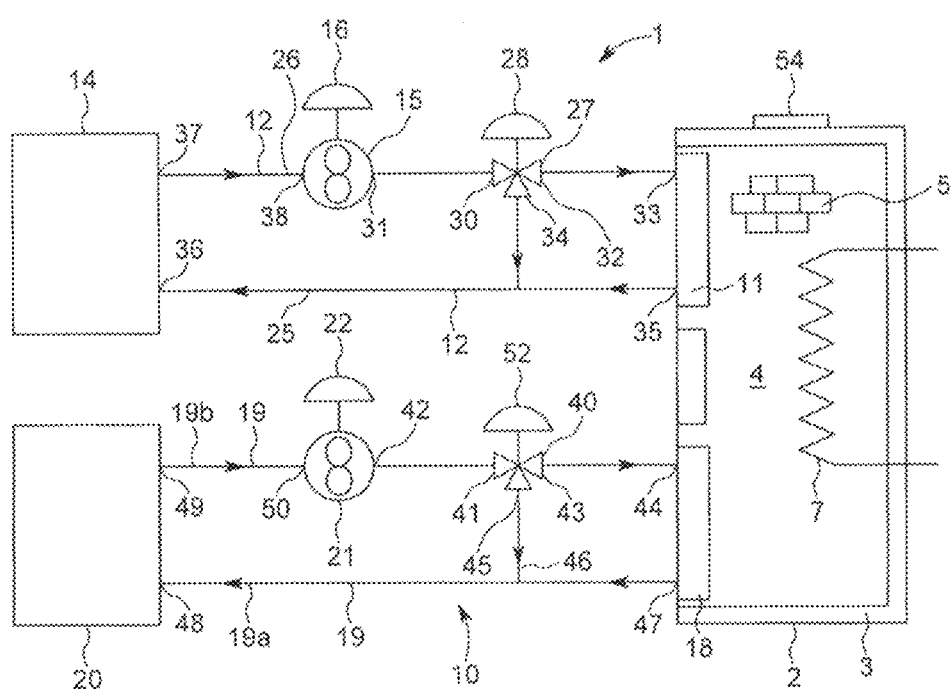
FIG. 1 is a schematic illustration of a thermal energy storage system according to the invention.

Referring to the drawings, and initially to FIGS. 1 to 9 thereof, there is illustrated a thermal energy storage system according to the invention, indicated generally by the reference numeral 1. The system 1 comprises a heat storage unit 2 having a thermally insulated housing 3 containing a heating core 4 of thermal storage material comprising a plurality of thermal storage bricks 5 and an electric heating element 7 for heating the thermal storage bricks 5 forming the core 4 to a desired temperature, typically in the range of about 650° C. to about 1000° C. Heat extraction apparatus, indicated generally by the reference numeral 10, is provided for extracting thermal energy from the core 4. The heat extraction apparatus 10 comprises a first air heat exchanger 11 connected to the core 4 to heat air in the first air heat exchanger 11. An air circulation pipe 12 or duct is connected between the first air heat exchanger 11 and a compartment to be heated, which in this case comprises an oven 14. An air circulation fan 15 is mounted in the air circulation pipe 12 between the air heat exchanger 11 and the compartment 14. A fan controller 16 is operable for controlling operation of the fan 15.

In this case, a second air heat exchanger 18 is provided on the housing 2 connected to the core 4. An associated air circulation pipe 19 or duct is connected between the second air heat exchanger 18 and a second compartment 20 which in this case is a space such as a room of a building, for example, to heat air in the second compartment 20. A second air circulation fan 21 mounted in the second air circulation pipe 19 is operable for circulating heating air through the second air circulation pipe 19 between the second air heat exchanger 18 and the compartment 20. A fan controller 22 for the second air circulating fan 21 controls operation of the second air circulating fan 21.

The air circulation pipe 12 has a feed line 25 for delivery of hot air from the first air heat exchanger 11 to the oven compartment 14 and a return line 26 for delivery of air from the oven compartment 14 to the first heat exchanger 11. A bypass valve 27 is provided between the feed line 25 and the return line 26 for bypassing the heat exchanger 11 in order to control the temperature of the heated air delivered to the oven compartment 14. A controller 28 is operable to control operation of the bypass valve 27 for blending a quantity of air from the return line 26 with air in the feed line 25 to regulate the temperature of air delivered by the feed line 25 to the oven chamber 14.

The first fan 15, which is electrically driven, is mounted in the return line 26. The bypass valve 27 is also mounted in the return line 26 downstream of the first electric fan 15 and has an inlet 30 connected to an outlet 31 of the fan 15, a first outlet 32 connected to an inlet 33 of the first air heat exchanger 11, and a second outlet 34 connected to the feed line 25, between an outlet 35 of the first air heat exchanger 11 and an inlet 36 of the oven compartment 14. An outlet 37 of the oven compartment 14 is connected to an inlet 38 of the first fan 15. The first fan 15 may be mounted at the outlet 37.

In similar fashion, a bypass valve 40 is mounted in the second air circulation pipe 19 and has an inlet 41 connected to an outlet 42 of the fan 21, a first outlet 43 connected to an inlet 44 of the second air heat exchanger 18 and a second outlet 45 connected via bypass line 46 with a feed line 19a of the second air circulation pipe 19 intermediate an outlet 47 of the second air heat exchanger 18 and an inlet 48 of the second compartment 20. An outlet 49 of the second compartment connects via a return line 19b of the second air circulation pipe 19 with an inlet 50 of the second fan 21. A controller 52 for the second bypass valve 40 regulates delivery of return air through the bypass line 46 for mixing with heated air in the feed line 19a of the second air circulation pipe 19 to control the temperature of air delivered into the second compartment 20.

Figure 2:
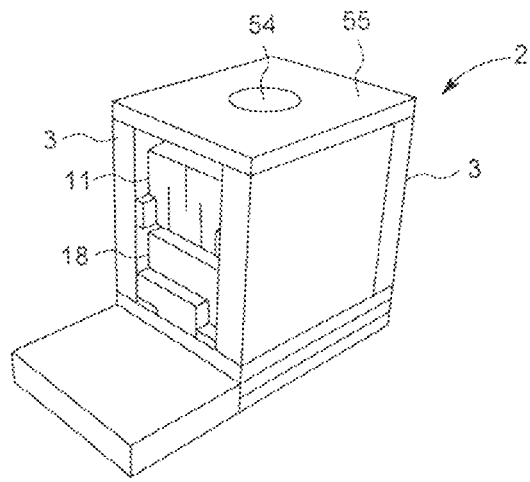
FIG. 2 is a perspective view of a heat storage unit forming portion of the thermal energy storage system.
Figure 3:
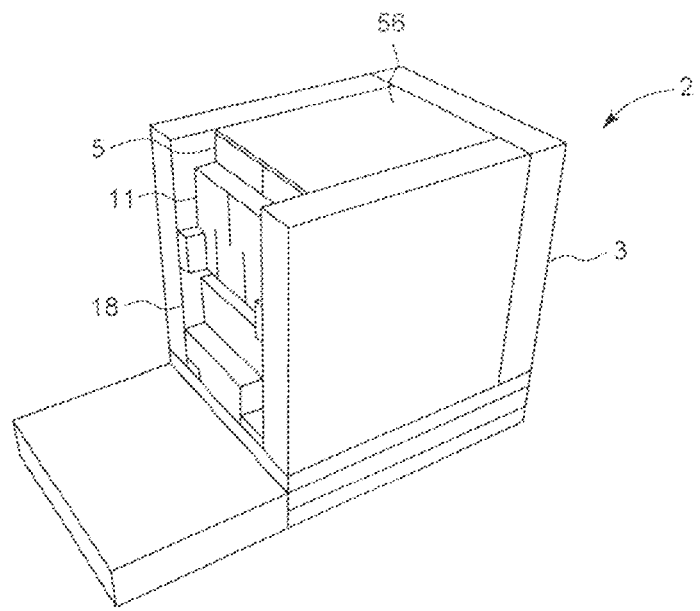
FIG. 3 is a detail perspective view of portion of the heat storage unit.
Figure 4:
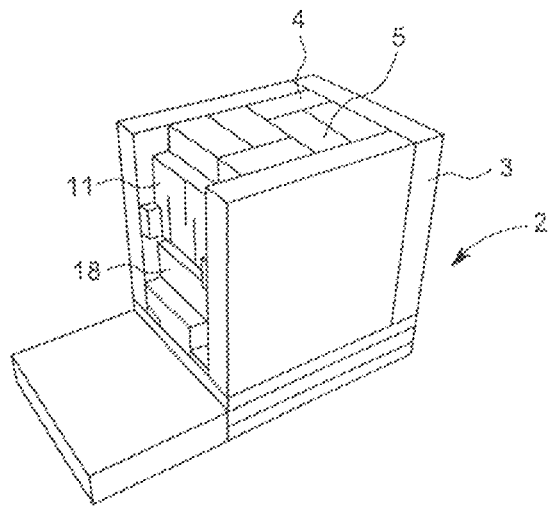
FIG. 4 is a detail perspective view of portion of the heat storage unit.

Optionally, one or more hot plates 54 may be mounted at a top of the housing 2. By way of example, FIG. 2 shows a single hot plate 54 mounted within an insulated top 55 of the housing 2. FIG. 3 shows the insulated top 55 removed, beneath which a stainless-steel plate 56 sits on top of the core 4 of thermal storage bricks 5. The steel plate 56 conducts heat from the hot bricks 5 to the hot plate 54.

Figure 5:
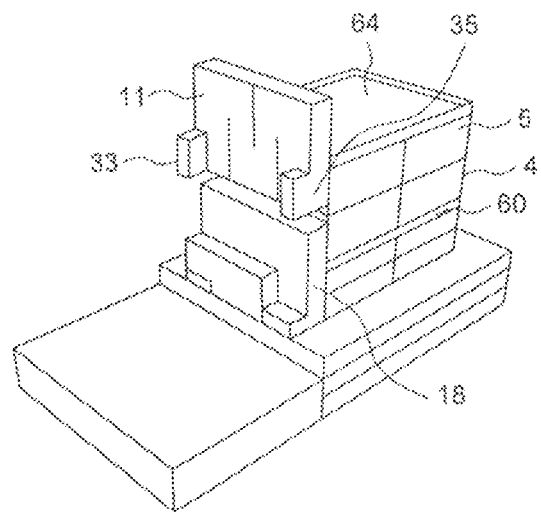
FIG. 5 is a detail perspective view of a partially assembled heat storage unit.
Figure 6:
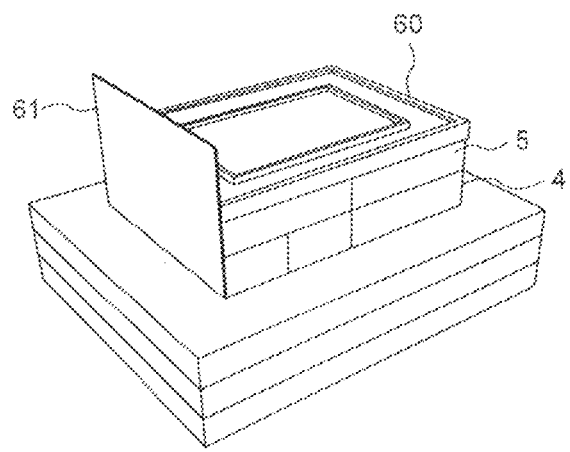
FIG. 6 is a detail perspective view of a partially assembled heat storage unit.
Figure 7:
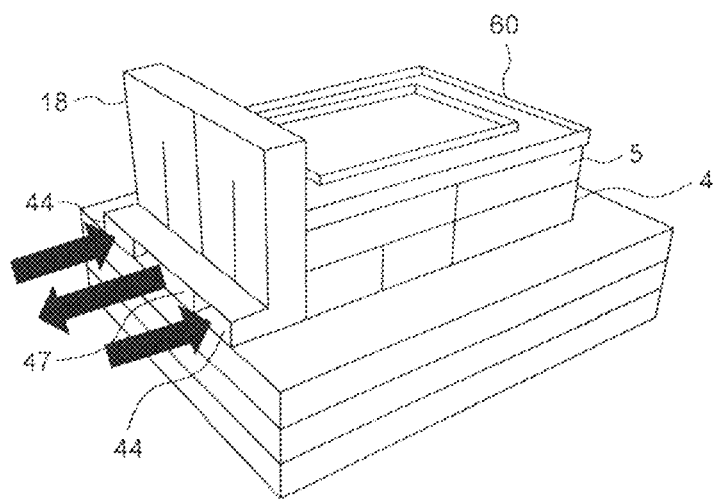
FIG. 7 is a detail perspective view of a partially assembled heat storage unit.

FIG. 5 shows the arrangement of the air heat exchangers 11, 18 on the core 4. Each heat exchanger 11, 18 has a housing with a tortuous air passageway extending through the housing between the air inlet 33, 44 and the air outlet 35, 47 of the housing. A T-shaped heat transfer plate is formed by a horizontal lower steel heat transfer plate 60 embedded in the core 4 and connected to an upright stainless steel heat transfer plate 61 which engages against an outer face of the core 4 and abuts an inner face of the second air heat exchanger 18 to transfer heat from the core 4 to the second air heat exchanger 18. Likewise, an upper stainless steel heat transfer plate 64 embedded in the core 4 abuts against an inner face of the first heat exchanger 11 and projects outwardly therefrom into the core 4 to transfer heat to the first heat exchanger 11. Both air heat exchangers 11, 18 are plate heat exchangers with internal baffles for efficient heat transfer to air delivered through the heat exchangers 11, 18.

Figure 8:
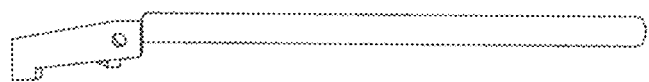
FIG. 8 is a detail elevational view of portion of the heat storage unit.
Figure 9:
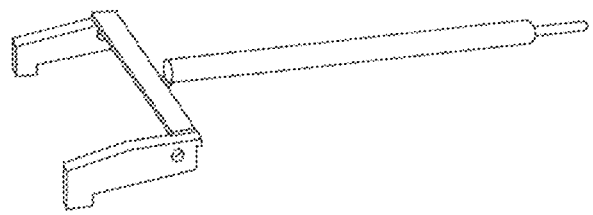
FIG. 9 is a perspective view of the portion shown in FIG. 8.
Figure 10:
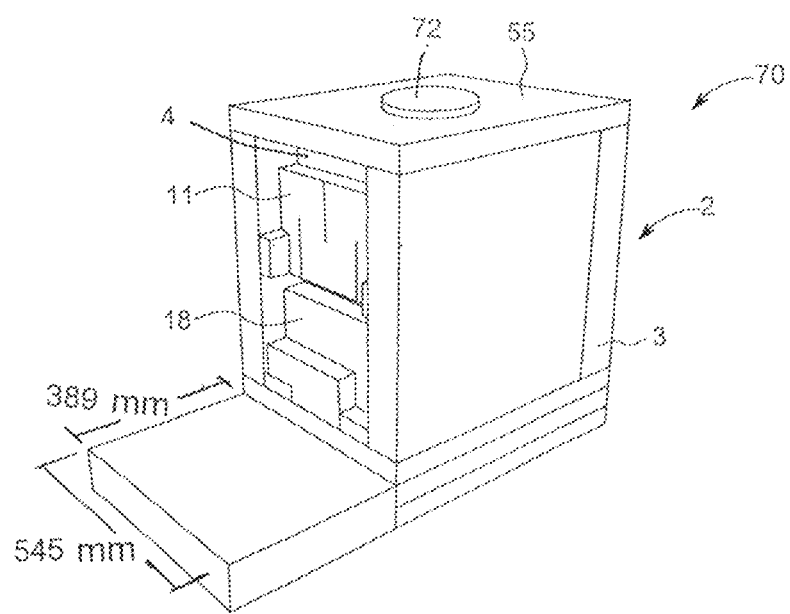
FIG. 10 is a perspective view of another heat storage unit for a thermal energy storage system according to a second embodiment of the invention.
Figure 11:
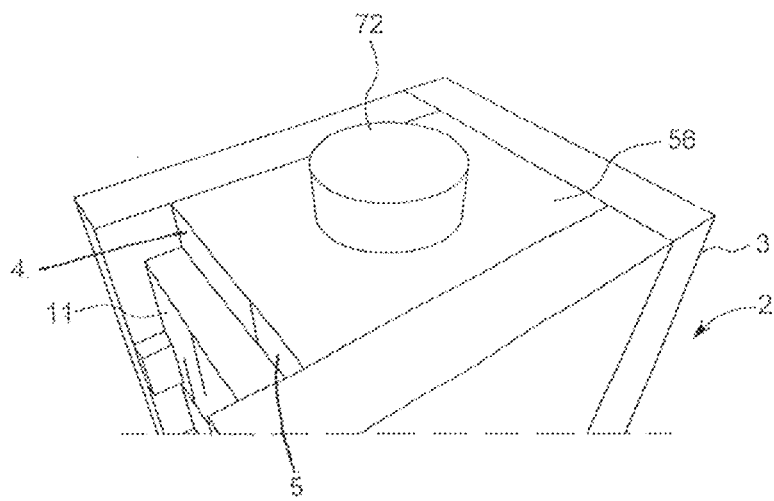
FIG. 11 is a detail perspective view showing portion of the heat storage unit of FIG. 10.

Referring in particular to FIG. 2, FIG. 8 and FIG. 9, each hot plate 54 is heated by a combination of hot air, radiation and conduction. The temperature of the hot air may be controlled as previously described by means of a plate heat exchanger, electric fan and blending valve. The amount of heat transferred to the hot plate 54 by radiation may be determined by the emissivity of the surface of the hot bricks 5 and the hot plate 54 and by the size of the opening through which the radiation passes. The size of this opening may be adjusted using sliding, revolving or rotating plates with low emissivity or reflective surfaces. The amount of heat transferred by conduction may be controlled by adjusting the contact area between the hot plate 54 and the hot bricks 5. This area may be adjusted by moving sliding plates and/or plugs of conductive material and provide thermal contact between the bricks 5 and the hot plate 54. The amount of heat transferred by conduction may also be controlled by adjusting the distance between an underside of the hot plate 54 and the steel plate 56 on top of the hot bricks 5. This may be achieved by supporting the hot plate 54 using metal rods in holes in the hot plate, as shown in FIG. 8 and FIG. 9. The rods expand when hot, lifting the hot plate 54 off the steel plate 56 and contract when cool, lowering the hot plate 54 onto the steel plate 56. This controls the temperature of the hot plate 54 and prevents the hot plate 54 from heating or cooling excessively.

The heat exchanger with the bypass valve enables the system to deliver air at a usable and safe temperature. The air at this regulated temperature can be safely used for the direct heating of rooms in a building.

The stored energy in the core can be used to heat an external plate that can act as a radiator or convector heater. The energy can be transferred to this external plate by radiation through one or more openings in the insulation that can be adjusted in size to regulate the amount of energy supplied and the temperature of the external plate. The surface of the heating core and the external plate can be coated with high emissivity material to improve the power of this system. The opening in the insulation can be created by simply sliding some of the insulating material to the side (or up or down) thereby creating a direct line of radiation from the heating core to the external plate. Adjusting the size of this opening will regulate the temperature of the external plate. The opening could also be created and controlled in the same way as described previously with regard to the hot plate 54.

In an alternative arrangement, the air supplied by the plate heat exchanger could be used to heat the equivalent to a conventional radiator, by using hot air to energize the radiator instead of hot water. The radiator could be fixed to the heat storage unit and connected directly to the heat exchanger, or mounted remotely and connected to the plate heat exchanger by insulated ducting.

Referring now to FIG. 10 to FIG. 14, there is shown another heat storage unit forming portion of a thermal energy storage system according to a second embodiment of the invention, indicated generally by the reference numeral 70. Parts similar to those described previously are assigned the same reference numerals. In this case, a graphite hot plate 72 is mounted on the steel plate 56.

Figure 12:
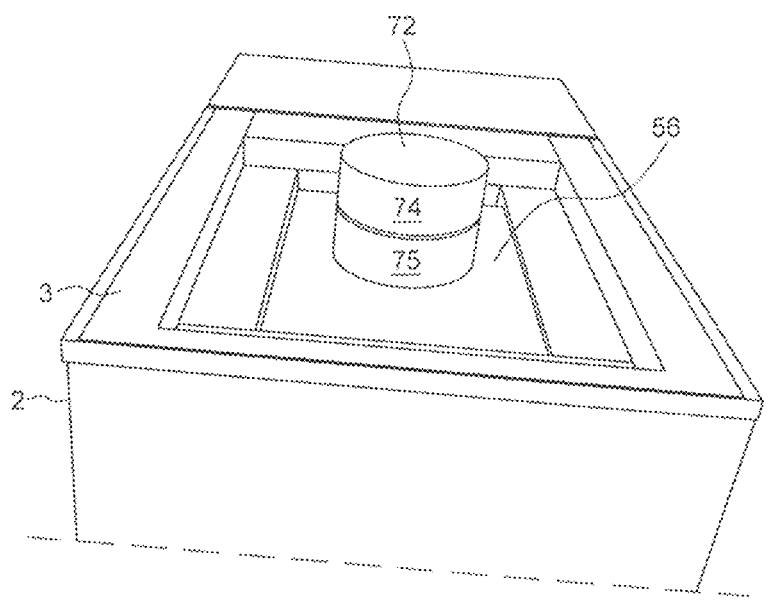
FIG. 12 is a detail perspective view showing portion of the heat storage unit of FIG. 10.
Figure 13:
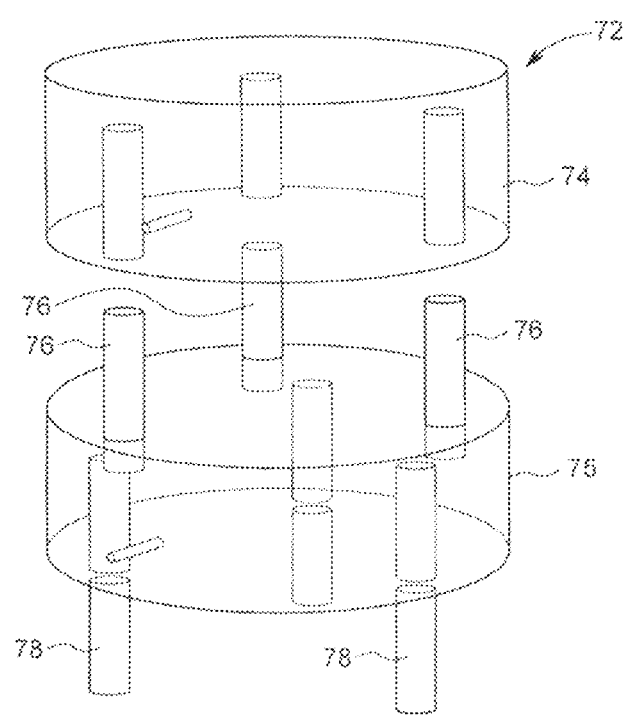
FIG. 13 is an enlarged detail perspective view of a hot plate portion of the heat storage unit of FIG. 10.
Figure 14:
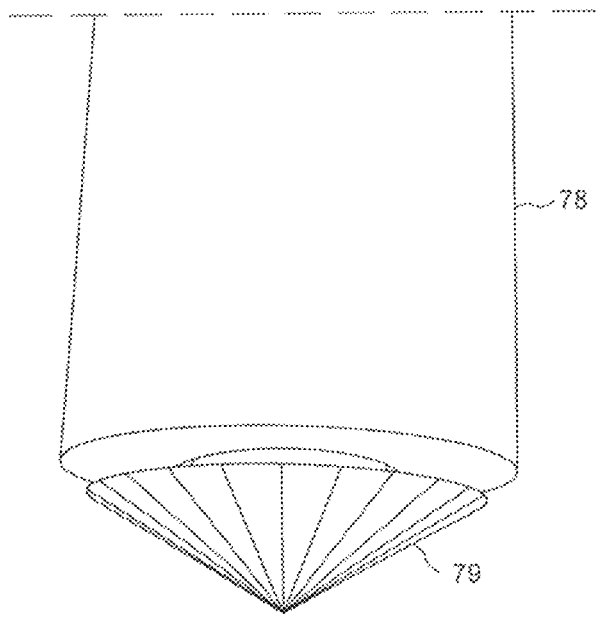
FIG. 14 is an enlarged detail perspective view showing a rod of the hot plate portion of FIG. 13.

With particular reference to FIG. 12 to FIG. 14, the graphite hot plate 72 comprises an upper graphite element 74 and an associated lower graphite element 75 stacked together and interconnected by intermediate brass connector rods 76 mounted in associated holes in a bottom of the upper graphite element 74 and a top of the lower graphite element 75. Lower brass support rods 78 are mounted on the lower graphite element 75 and project downwardly therefrom to engage the steel plate 56. Pointed steel inserts 79 are provided in the lower ends of the lower brass support rods 78. This is to minimize the direct transfer of heat from the hot steel plate 56 to the brass support rods 78, thereby ensuring that the temperature of the brass support rods 78 is the same as the temperature of the lower graphite element 75. This also prevents the brass support rods 78 from coming into direct contact with the steel plate 56. This arrangement ensures that the graphite elements 74, 75 and brass support rods 78 are lifted off the steel plate when they reach 420° C. and drop back down onto the steel plate 56 when they cool down. Also, the brass connector rods 76 expand when heated to separate the graphite elements 74, 75 and control the hot plate 72 temperature. Conveniently, two or three sets of graphite hot plates 72 may be provided, one acting as a hot plate at about 300° C., a second one acting as a moderate plate at about 150° C., and another one acting as an instant water heater. The instant water heater will be maintained at about 95° C. It will contain a pipe coil that water will flow through en route to a hot tap. Thus, thermal energy is provided for boiling water for cooking and tea/coffee making.

Figure 15:
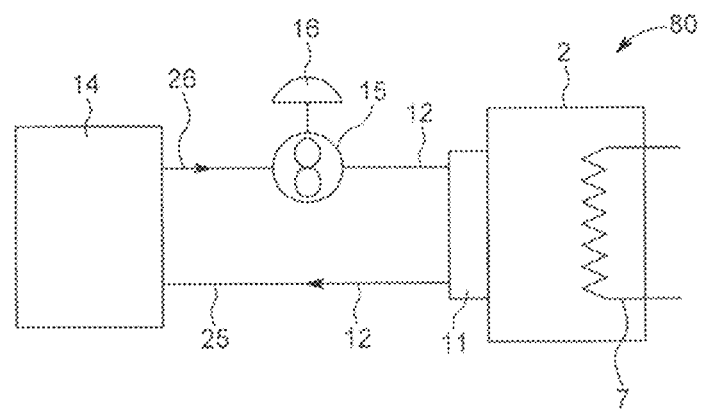
FIG. 15 is a schematic illustration of another thermal energy storage system according to the invention.

Referring now to FIG. 15, there is shown another thermal energy storage system according to a third embodiment of the invention, indicated generally by the reference numeral 80. Parts similar to those described previously are assigned the same reference numerals. This is similar to the system shown in FIG. 1 but without the bypass valve. The heat storage unit 2 is shown connected to a single compartment 14, 20 which is shown as the oven compartment 14, but could be the second compartment 20. The air temperature within the compartment 14, 20 is in this case controlled by operation of the fan 15 by the controller 16 to either switch the fan 15 on and off, or to regulate the speed of the fan 15.

Figure 16:
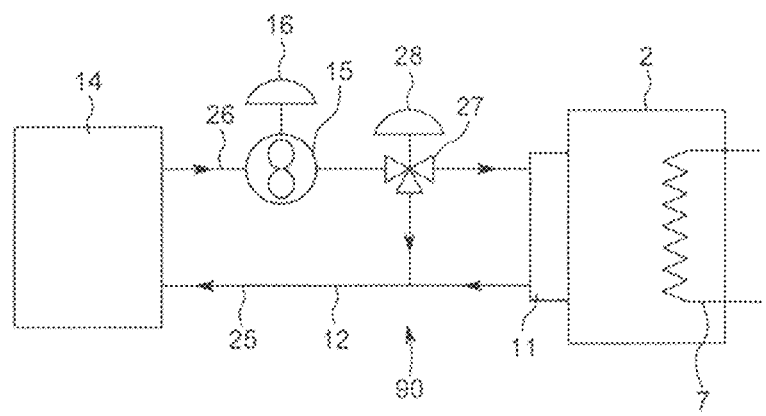
FIG. 16 is a schematic illustration of a further thermal energy storage system according to the invention.

Referring now in particular to FIG. 16, there is shown another thermal energy storage system according to a further embodiment of the invention, indicated generally by the reference numeral 90. Parts similar to those described previously are assigned the same reference numerals. This is largely similar to the arrangement shown in FIG. 1, however, in this case, both the bypass valve 27 and the fan 15 are operable to control the temperature of air delivered into the compartment 14. The drawing illustrates a heat storage unit 2 connected to a single compartment 14, 20 which is shown as the oven compartment 14, but could be the second compartment 20.

Figure 17:
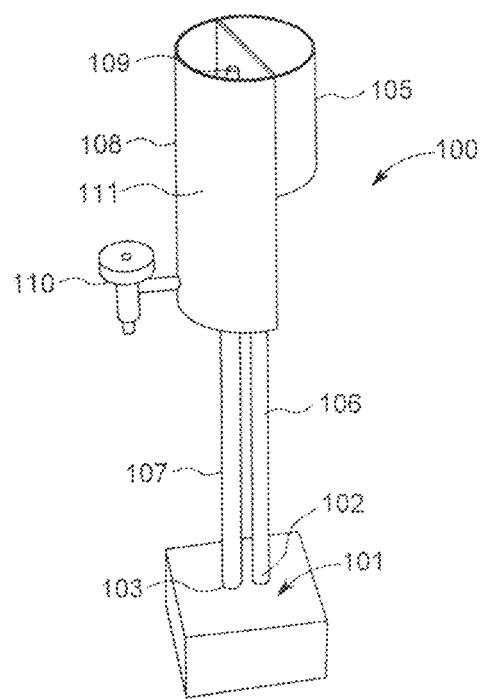
FIG. 17 is a schematic illustration of a water boiler portion of another thermal energy storage system according to the invention.
Figure 18:
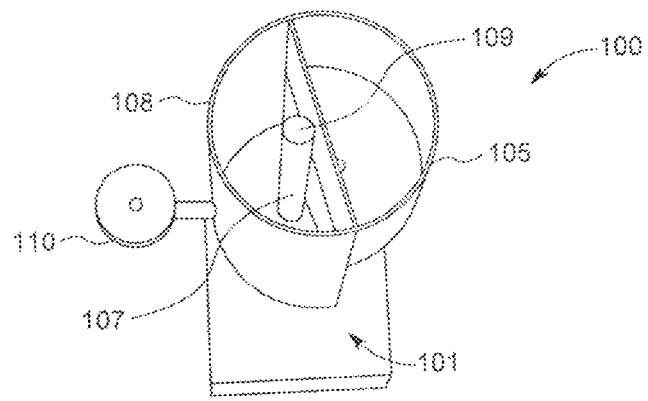
FIG. 18 is another schematic illustration of the water boiler shown in FIG. 17.

Referring now in particular to FIG. 17 and FIG. 18, there is shown a water boiler portion of another thermal energy storage system according to the invention, indicated generally by the reference numeral 100. Parts similar to those described previously are assigned the same reference numerals. The water boiler 100 has a water heating tank 101 which is embedded in the heating core 4. The water heating tank 101 has a water inlet 102 and an outlet 103. A water supply tank 105 is connected by a water supply pipe 106 to the inlet 102 of the water heating tank 101. A hot water discharge pipe 107 extends from the outlet 103 of the water heating tank 101 and into a hot water dispensing tank 108, the hot water discharge pipe 107 having an inlet adjacent a bottom of the water heating tank 101 and an outlet 109 which terminates about 50 mm below a top of the hot water dispensing tank 108. Covers or lids (not shown) are provided for the water supply tank 105 and the hot water dispensing tank 108. A tap 110 is provided on a side wall 111 of the hot water dispensing tank 108 for discharging hot water therefrom as required. The hot water dispensing tank 108 is preferably insulated to keep the water hot and to protect users from the hot side wall 111 of the hot water dispensing tank 108.

In use, water is poured into the water supply tank 105 and is delivered by water supply pipe 106 into the water heating tank 101 wherein the water is heated. Steam and boiling water are driven up the hot water discharge pipe 107 into the hot water dispensing tank 108 from where it can be discharged via the tap 110 for making tea, coffee and the like. Advantageously, water can be heated quickly and efficiently as required.

It is envisaged that a variant of the water boiler could be used for cooking purposes, for boiling eggs, steaming vegetables, cooking spinach or rice for example. In this case it may be desirable to re-cycle the steam/water by draining condensate from the hot water dispensing tank 108 back to the water heating tank 101 where it is converted back into steam that is driven back up into the hot water dispensing/steam cooking tank 108.

Figure 19:
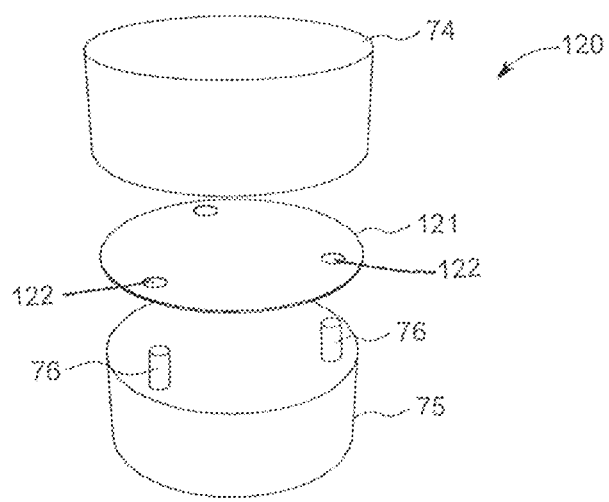
FIG. 19 is a detail perspective view of a hot plate assembly forming portion of another heat storage unit.

Referring to FIG. 19, there is shown a graphite hot plate assembly, indicated generally by the reference numeral 120, for use with heat storage units of the invention. This hot plate assembly 120 is largely similar to the hot plate assembly 72 shown in FIG. 12 to FIG. 14, and like parts are assigned the same reference numerals. In this case, an insert comprising a disc 121 of heat reflective material is mounted between the upper graphite element 74 and the lower graphite element 75 to reduce the transfer of heat from the lower graphite element 75 to the upper graphite element 74 by radiation when the graphite elements 74, 75 are separated. The connector rods 76 pass through associated through holes 122 in the disc 212. As previously described, the intermediate brass connector rods 76 mounted between the two graphite elements 74, 75 expand when the system heats up to lift the upper graphite element 74 away from the lower graphite element 75.

Figure 20:
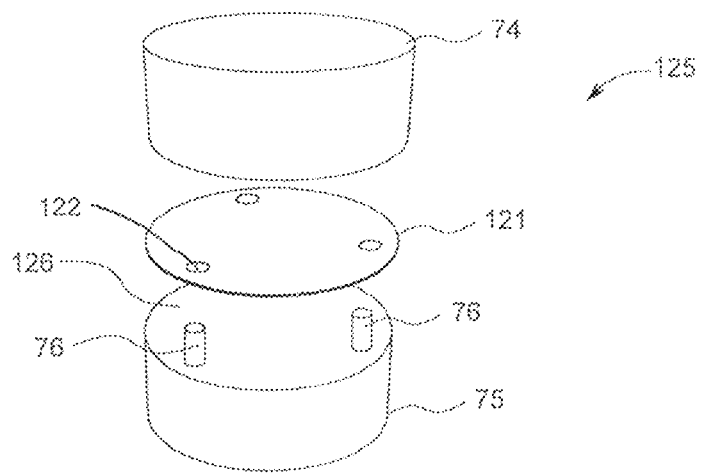
FIG. 20 is a detail exploded perspective view of another hot plate assembly forming portion of another heat storage unit of the invention.

Referring now to FIG. 20, there is shown another hot plate assembly, indicated generally by the reference numeral 125, for use with heat storage units of the invention. This hot plate assembly 125 is largely similar to the hot plate assembly 120 shown in FIG. 19, and like parts are assigned the same reference numerals. In this case, a top surface of the lower graphite element 75 is coated with a low emissivity material 126 to further reduce the transfer of heat from the lower graphite element 75 to the upper graphite element 74 by radiation when they are separated. Optionally also, a bottom surface of the upper graphite element 74 may also be coated with a low emissivity material to further reduce the transfer of heat from the lower graphite element 75 to the upper graphite element 74 by radiation when they are separated.

Referring now to FIG. 21 to FIG. 24, there is shown a thermal energy storage system according to another embodiment of the invention, indicated generally by the reference numeral 130. Parts similar to those described previously are assigned the same reference numerals. The system 130 forms a cooker and has a heat storage unit 2 connected to an oven 14 and hot plates (not shown) mounted on top of the heat storage unit 2. In this case, an air heat exchanger 131 is embedded within the heating core 4 and connected to the oven 14.

The heat exchanger 131 comprises a rectangular upper heat transfer plate 132 and an associated rectangular lower heat transfer plate 133 with a T-shaped housing 134 formed therebetween by side walls 135 extending between the heat transfer plates 132, 133 and perpendicular thereto. A central internal baffle plate 136 which extends between the heat transfer plates 132, 133 within the housing 134 forms a U-shaped air passageway 137 within the housing 134 between an inlet 138 and an outlet 139 of the housing 134.

A downwardly stepped duct 140 is mounted at the outlet 139, and also at the inlet 138 (not shown), to prevent convection currents from causing uncontrolled heat loss from the heat exchanger 131. Insulating gaskets 142 are provided at flanged connections between the inlet 138 and outlet 139 of the heat exchanger 131 and ducting connected to the associated oven 14 to reduce conduction causing heat loss from the heat exchanger 131. The fan 15 mounted in the oven 14 is operable to circulate hot air between the heat exchanger 131 and oven 14 interior. When the fan 15 is switched off air movement stops because of the downwardly stepped ducts 140 at the inlet 138 and the outlet 139 of the heat exchanger 131.

Figure 21:
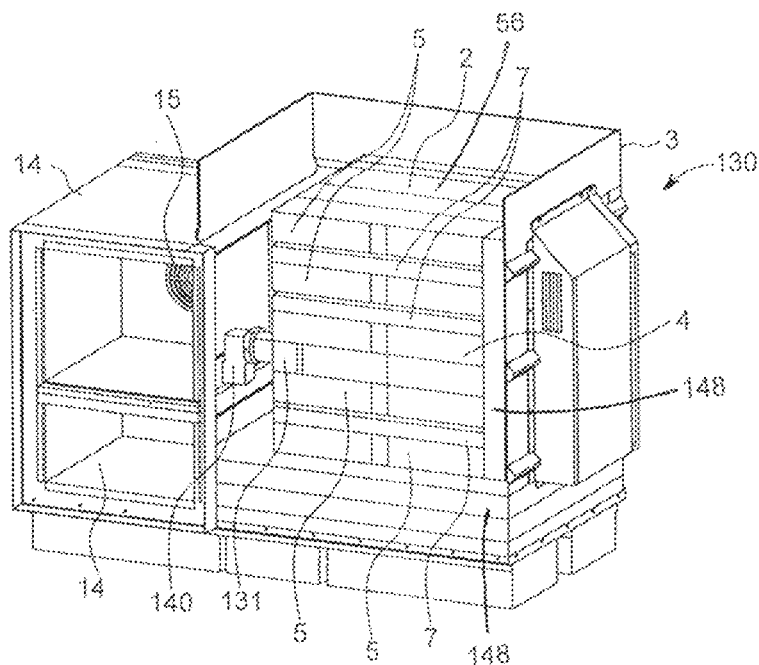
FIG. 21 is a perspective view of another heat storage unit for a thermal energy storage system according to another embodiment of the invention.
Figure 22:
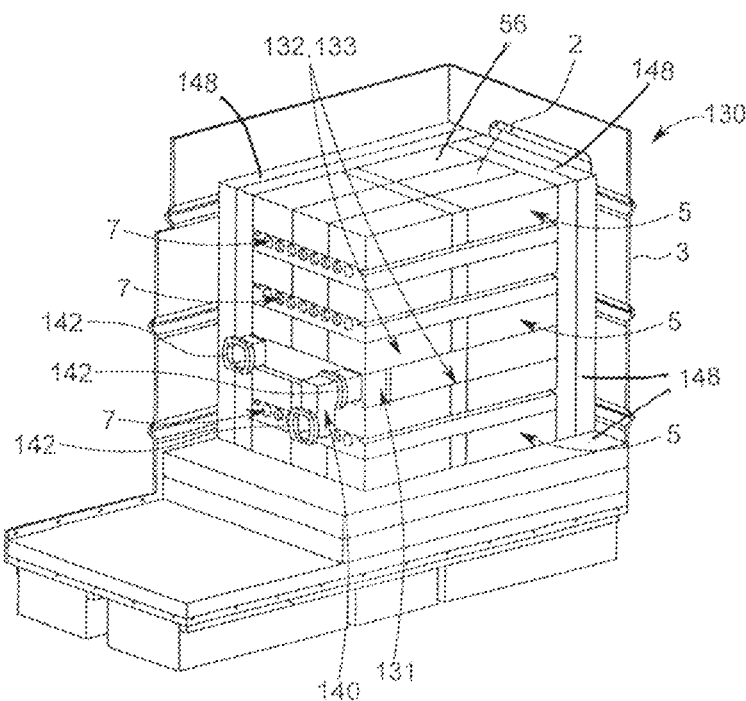
FIG. 22 is a detail perspective view showing portion of the heat storage unit of FIG. 21.
Figure 23:
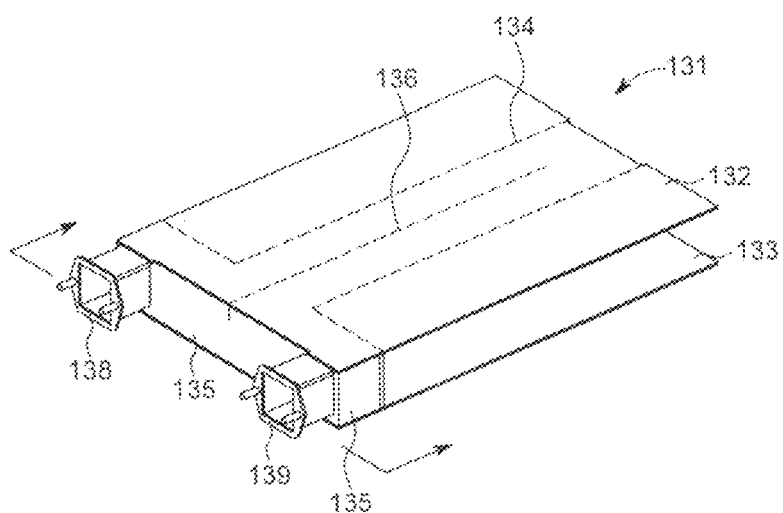
FIG. 23 is a detail perspective view of a heat exchanger forming portion of the heat storage unit of FIG. 21.
Figure 24:
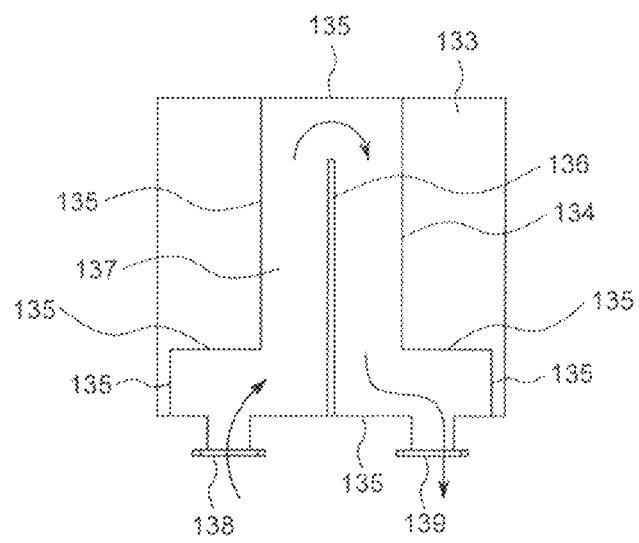
FIG. 24 is a sectional view of the heat exchanger, taken along the line XXIV-XXIV of FIG. 23.

FIG. 21 and FIG. 22 show the construction of the heat storage unit 2 with layers of heat storage bricks 5, with heating elements 7 and the heat exchanger 131 mounted between layers of the heat storage bricks 5 which form the core 4 which is surrounded by the thermally insulated housing 3 with insulation material 148.

In the embodiments described herein, the heating core of thermal storage material is provided by a plurality of thermal storage bricks 5. It will be appreciated that alternative core constructions are possible comprising one or more thermal storage material components.

A number of embodiments comprising various features of the invention have been described as examples of the invention. However, it will be appreciated that any other combinations of the heat storage unit with hot plates and/or the various heat extraction apparatus with one or more of the compartments to be heated may be provided in accordance with the invention to form cookers and/or heating systems for buildings.

The heat storage unit of the invention operates the heating core at a relatively high temperature in use, which enables it to store a large amount of energy which is then provided by the system of the invention at safely usable temperatures to provide a heating system for a building and/or a cooker.

The terms "comprise" and "include", and any variations thereof required for grammatical reasons, are to be considered as interchangeable and accorded the widest possible interpretation.

The invention is not limited to the embodiments hereinbefore described but may be varied in both construction and detail within the scope of the appended claims.

What is claimed is:

1. A cooking apparatus with a thermal energy storage system comprising:
    a heat storage unit having a thermally insulated housing containing a heating core of thermal storage material and an electric heating element for heating the heating core to a desired temperature,
    heat extraction apparatus for extracting thermal energy from the heating core,
    the heat extraction apparatus comprising an air heat exchanger mounted within the heating core to heat air in the air heat exchanger,
    an air circulation pipe connected between the air heat exchanger and an oven compartment to be heated,
    an air circulation fan mounted at an outlet of the oven compartment for circulating air through the air circulation pipe between the air heat exchanger and the oven compartment,
    wherein the heat exchanger has a housing with an air passageway extending through the heat exchanger housing between an air inlet and an air outlet of the heat exchanger housing, the heat exchanger comprising an upper heat transfer plate and an associated lower heat transfer plate with the heat exchanger housing formed therebetween by side walls extending between the upper heat transfer plate and the lower heat transfer plate, an internal baffle plate which extends between the upper heat transfer plate and the lower heat transfer plate within the heat exchanger housing forming a U-shaped air passageway within the heat exchanger housing between the air inlet and the air outlet of the heat exchanger housing.

2. The cooking apparatus as claimed in claim 1, wherein the heat exchanger housing is a T-shaped housing centrally mounted between the upper heat transfer plate and the lower heat transfer plate leaving a slot at each side of the heat exchanger housing between the heat transfer plates, each slot being filled with the thermal storage material forming the core.

3. The cooking apparatus as claimed in claim 1, wherein the heat exchanger housing has a downwardly stepped air inlet duct at the air inlet and a downwardly stepped air outlet duct at the air outlet of the heat exchanger housing.

4. The cooking apparatus as claimed in claim 1, wherein the air circulation pipe has a feed line for delivering air from the heat exchanger to the compartment and a return line for delivering air from the compartment to the heat exchanger, a bypass valve mounted between the feed line and the return line for bypassing the heat exchanger, the bypass valve having a controller which is operable for blending a quantity of air from the return line with air in the feed line to regulate the temperature of air delivered by the feed line to the compartment.

5. The cooking apparatus as claimed in claim 1, wherein a fan controller is provided for controlling operation of the air circulation fan to regulate the temperature in the compartment.

6. The cooking apparatus as claimed in claim 1, wherein at least one hot plate is mounted on the housing in thermal communication with the core.

7. The cooking apparatus as claimed in claim 1, wherein a water boiler is mounted on the heat storage unit, the water boiler comprising a water heating tank mounted on or within the heating core, the water heating tank having a water inlet for connection to a water supply and an outlet for discharging hot water and steam from the water heating tank.

\* \* \* \* \*